(12) United States Patent
Dicken et al.

(10) Patent No.: US 11,260,600 B2
(45) Date of Patent: Mar. 1, 2022

(54) METHOD FOR CALIBRATING AN IRRADIATION DEVICE FOR AN APPARATUS FOR ADDITIVELY MANUFACTURING THREE-DIMENSIONAL OBJECTS

(71) Applicant: Concept Laser GmbH, Lichtenfels (DE)

(72) Inventors: Christian Dicken, Lichtenfels (DE); Moritz Beck, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 137 days.

(21) Appl. No.: 16/669,913

(22) Filed: Oct. 31, 2019

(65) Prior Publication Data

US 2021/0129441 A1    May 6, 2021

(51) Int. Cl.
| | |
|---|---|
| *B29C 64/30* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B29C 64/153* | (2017.01) |

(52) U.S. Cl.
CPC .......... *B29C 64/393* (2017.08); *B29C 64/153* (2017.08); *B33Y 10/00* (2014.12); *B33Y 30/00* (2014.12); *B33Y 50/02* (2014.12)

(58) Field of Classification Search
CPC ..... B29C 64/153; B29C 64/393; B33Y 10/00; B33Y 30/00; B33Y 50/02
See application file for complete search history.

(56) References Cited

U.S. PATENT DOCUMENTS

| | | |
|---|---|---|
| 5,832,415 A | 11/1998 | Wilkening et al. |
| 9,341,467 B2 | 5/2016 | Snis |
| 10,336,008 B2 | 7/2019 | Perret et al. |
| 10,946,581 B2 | 3/2021 | Domröse et al. |
| 2018/0370144 A1 | 12/2018 | Revanur et al. |
| 2019/0070788 A1 | 3/2019 | Rosegen et al. |
| 2019/0134747 A1 | 5/2019 | Herzog et al. |
| 2019/0240906 A1 | 8/2019 | Zeulner et al. |

(Continued)

FOREIGN PATENT DOCUMENTS

| | | | |
|---|---|---|---|
| DE | 102016222186 B3 * | 4/2018 | ........... B23K 26/082 |
| WO | WO2019/161886 A1 | 8/2019 | |

*Primary Examiner* — Joseph S Del Sole
*Assistant Examiner* — Jamel M Nelson
(74) *Attorney, Agent, or Firm* — Dority & Manning, P.A.

(57) ABSTRACT

Methods for calibrating an irradiation device for an apparatus for additively manufacturing three-dimensional objects include generating at least two first and two second calibration patterns, in at least two different first positions and at least two different second positions; determining position information relating to the positions of the calibration patterns; generating a calibration quality value relating to a calibration status of the irradiation device; simulating at least two first calibration patterns and at least two second calibration patterns based on at least one changed irradiation parameter; determining a calibration quality value for the simulated calibration patterns; and repeating the simulation and determination of the calibration quality value until a maximum or minimum calibration quality value is reached.

19 Claims, 3 Drawing Sheets

(56) References Cited

U.S. PATENT DOCUMENTS

| | | |
|---|---|---|
| 2020/0050169 A1 | 2/2020 | Petratschek et al. |
| 2020/0055253 A1 | 2/2020 | Knorr et al. |
| 2020/0061924 A1 | 2/2020 | Burggraf |
| 2020/0070424 A1 | 3/2020 | Hunze |
| 2020/0086557 A1 | 3/2020 | Klaubner et al. |
| 2020/0094482 A1 | 3/2020 | Dohler |

* cited by examiner

METHOD FOR CALIBRATING AN IRRADIATION DEVICE FOR AN APPARATUS FOR ADDITIVELY MANUFACTURING THREE-DIMENSIONAL OBJECTS

BRIEF DESCRIPTION

Aspects and advantages will be set forth in part in the following description, or may be obvious from the description, or may be learned through practicing the presently disclosed subject matter.

In one aspect, the present disclosure embraces methods for calibrating an irradiation device for an apparatus for additively manufacturing three-dimensional objects. Exemplary methods may include generating at least two first and two second calibration patterns, determining position information relating to the positions of the at least two first and second calibration patterns, and generating a calibration quality value relating to a calibration status of the irradiation device for at least one part of a beam guiding plane based on the determined position information. In exemplary methods, the at least two first calibration patterns may be generated in at least two different first positions via the first energy beam and the at least two second calibration patterns are generated in at least two different second positions via the second energy beam.

Exemplary methods may additionally or alternatively include simulating at least two first calibration patterns and at least two second calibration patterns based on at least one changed irradiation parameter, and determining a calibration quality value for the simulated calibration patterns. Exemplary methods may further include repeating the simulation of calibration patterns based on adjusted irradiation parameters and determination of the calibration quality value until a maximum or minimum calibration quality value is reached.

In another aspect, the present disclosure embraces apparatuses for additively manufacturing three-dimensional objects. Exemplary apparatuses may include irradiation device may include at least a first and a second irradiation unit adapted to guide at least a first and a second energy beam. Exemplary apparatuses may be configured to perform successive layerwise selective irradiation and consolidation of layers of a build material which can be consolidated by means of an energy beam. Exemplary apparatuses may include a determination device configured to perform a method of calibrating an irradiation device in accordance with the present disclosure.

In yet another aspect, the present disclosure embraces computer-readable medium that include computer-executable instructions, which when executed by a determination unit associate with an apparatus for additively manufacturing three-dimensional objects, causes the determination unit to perform a method of calibrating an irradiation device in accordance with the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
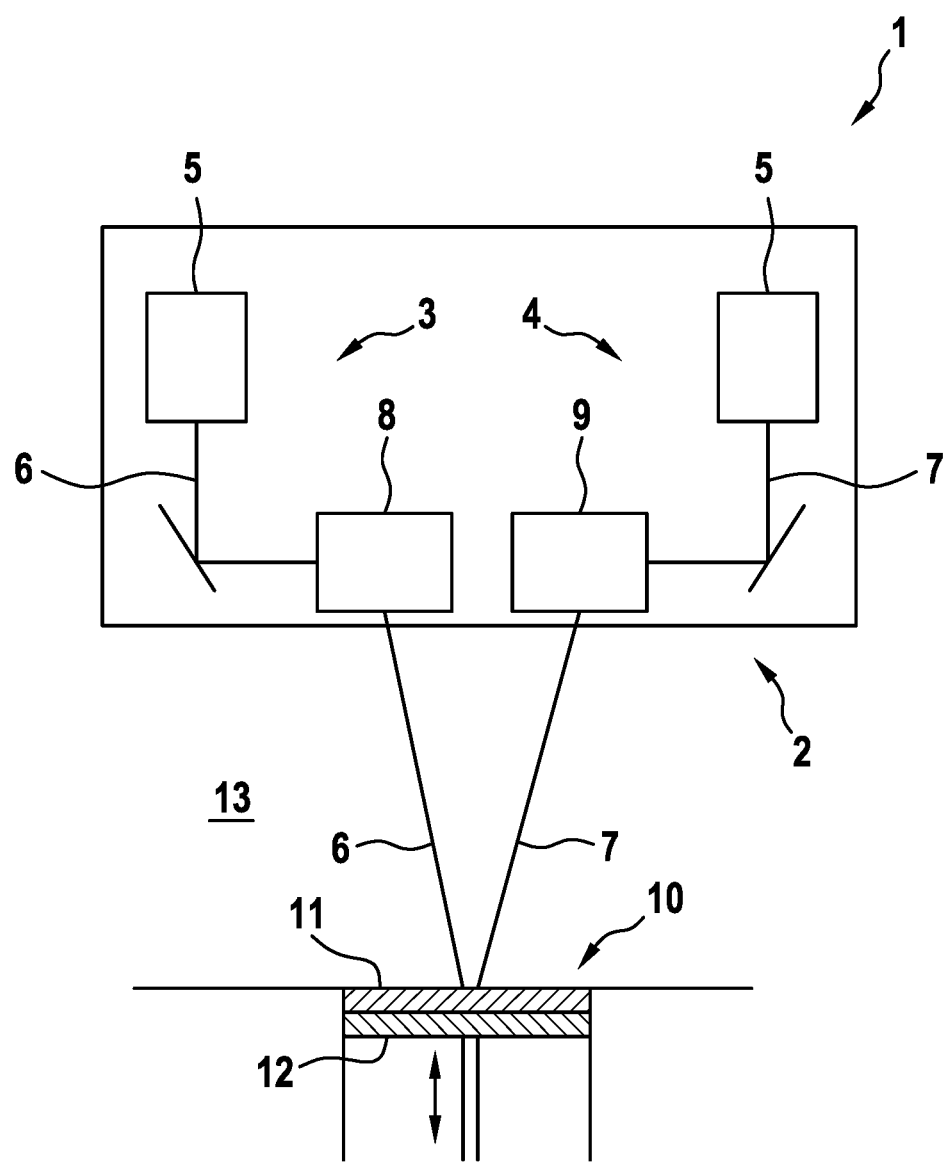
FIG. 1 shows an inventive apparatus.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail.

The invention relates to a method for calibrating an irradiation device for an apparatus for additively manufacturing three-dimensional objects by means of successive layerwise selective irradiation and consolidation of layers of a build material which can be consolidated by means of an energy beam, which irradiation device comprises at least a first and a second irradiation unit adapted to guide at least a first and a second energy beam.

Apparatuses for additively manufacturing three-dimensional objects by irradiating a build material with an energy beam generated via an irradiation device and methods for calibrating the same are generally known from prior art. As the irradiation time required to irradiate build material in each single layer of the object contributes to the overall manufacturing time, different approaches are known to reduce this irradiation time. Inter alia, such an irradiation device may comprise at least two irradiation units, e.g. a first and a second irradiation unit adapted to guide at least a first and a second energy beam in a beam guiding plane, e.g. the build plane.

In other words, such irradiation devices are adapted to generate two different energy beams and guide the at least two different energy beams individually via the corresponding irradiation units, e.g. scanning mirrors or the like. As the energy beams are individually guided across a build plane via individual irradiation units, it is necessary to calibrate the irradiation device in that both irradiation units or all irradiation units, respectively, are calibrated with respect to each other in order to avoid or prevent stitching errors or other positioning errors.

For calibrating the different irradiation units of the irradiation device, it is known from prior art to irradiate a test specimen with a calibration pattern with the first and the second irradiation unit, in general with every irradiation unit of the irradiation device, and after the calibration patterns are irradiated on the test specimen, the test specimen can be analyzed to verify whether the calibration patterns are properly positioned and/or aligned with respect to each other. If a deviation, in particular in the alignment or the positioning of at least one of the patterns is observed, at least one parameter of the irradiation device can be adjusted accordingly, wherein another calibration process in which further calibration patterns can be irradiated in another test specimen can be performed to verify whether the adjustment has properly corrected the deviations.

Thus, it is necessary to perform at least two calibration processes, if a deviation occurs, wherein the adjustment of the at least one parameter of the irradiation device may also lead to further deviations that require an adjustment of other (dependent) parameters of the irradiation device. Therefore, the calibration process can be cumbersome and time-consuming and may involve several irradiation and measurement steps until an optimum set of parameters is found for the irradiation device.

It is an object of the present invention to provide an improved method for calibrating an irradiation device for an apparatus for additively manufacturing three-dimensional objects, wherein in particular the necessary number of calibration process steps can be reduced and the calibration process can be performed more efficiently.

The object is inventively achieved by a method according to claim 1. Advantageous embodiments of the invention are subject to the dependent claims.

The method described herein is a method for calibrating an irradiation device for an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for calibrating an irradiation device for an apparatus for additively manufacturing three-dimensional objects. Thus, the invention relates to a method for calibrating toward or more irradiation units of an irradiation device in order to avoid or prevent deviations or errors relating to the at least two energy beams being guided across the build plane.

The inventive method comprises the following steps: generating at least two first and two second calibration patterns, wherein the at least two first calibration patterns are generated in at least two different first positions via the first energy beam and the at least two second calibration patterns are generated in at least two different second positions via the second energy beam; determining position information relating to the positions of the at least two first and second calibration patterns; generating a calibration quality value relating to a calibration status of the irradiation device for at least one part of a beam guiding plane, in particular an entire build plane, based on the determined position information, particularly based on a sum of deviations of the calibration patterns; simulating at least two first calibration patterns and at least two second calibration patterns based on at least one changed irradiation parameter; determining a calibration quality value for the simulated calibration patterns; repeating the simulation of calibration patterns based on adjusted irradiation parameters and determination of the calibration quality value until a maximum or minimum calibration quality value is reached.

First, at least two first and two second calibration patterns are generated, wherein the at least two first calibration patterns are generated in at least two first positions via the first energy beam, wherein the two first positions are different. The at least two second calibration patterns are generated in at least two different second positions via the second energy beam. Therefore, the first energy beam is guided to generate two or more first calibration patterns in different positions and the second energy beam is guided to generate two or more second calibration patterns in different second positions.

Subsequently, position information can be determined that relate to the positions of the at least two first and second calibration patterns. For example, it is possible to measure the positions in which the first and second calibration patterns are generated. Based on the determined position information, it is possible to generate a calibration quality value that relates to a calibration status of the irradiation device for at least one part of the beam guiding plane, in particular an entire build plane. The calibration quality value can particularly be determined based on a sum of the square of deviations of the generated calibration patterns. For example, the deviation of each position of the generated calibration patterns from a nominal position can be determined by determining the position information, wherein the deviations of each of the calibration patterns can be summed up to an overall sum of the square of deviations. Based on this sum of the square of deviations it is possible to generate the calibration quality value. The calibration quality value therefore, may be a scalar that indicates the overall calibration quality.

Further, it is possible to simulate at least two first calibration patterns and at least two second calibration patterns based on at least one changed irradiation parameter. For example, starting from the initial set of irradiation parameters at least one irradiation parameter may be changed and the effect on the first calibration patterns and the second calibration patterns can be simulated. The term "simulation" or "simulate" refers to at least one change performed based on the determined information of the calibration patterns, e.g. generating different positions or scaling or the like. In other words, it is possible to derive how the first calibration patterns and the second calibration patterns are changed depending on the change of the irradiation parameter. Thus, for the simulated calibration patterns, i.e. the first and second calibration patterns that are simulated based on the at least one changed irradiation parameter, a calibration quality value can be determined. Thus, it is possible to determine the calibration quality value for the simulated set of first and second calibration patterns and therefore, derive whether the overall calibration quality has been improved due to the change of the irradiation parameter, whether the change of the irradiation parameter had no effect on the calibration quality or whether the calibration equality is decreased by the change of the parameter.

Based on the change, in particular the improvement of the calibration quality value, it is possible to repeat the simulation of calibration parameters based on an adjusted irradiation parameter and determination of the calibration quality value until a maximum or minimum calibration quality value is reached. In other words, the calibration process, in particular the steps of simulating first and second calibration patterns based on changed irradiation parameters and determining the resulting calibration quality value can be repeated until a maximum or minimum calibration quality value is reached. The maximum or minimum calibration quality value indicates that with the given set of parameters or the possible changes in an allowed range of irradiation parameters and optimum calibration is reached or that a further change of irradiation parameters cannot significantly improve the calibration quality beyond the reached calibration quality value. Of course, different irradiation parameters can be changed, e.g. simultaneously or in series.

Inter alia, the simulation process may be performed based on a vector transformation, wherein the individual positions of the at least two first and second calibration patterns can be transformed in that the overall distribution of deviations of the first and second calibration patterns from their nominal values can be regarded as vector field. In other words, a deviation between a nominal value and an actual value of a position of a calibration pattern may be represented as vector. By performing changes of the irradiation parameters, it is possible that the overall sum of deviations can be reduced. In particular, it is possible that single deviations may be increased or kept constant, whereas other deviations are significantly reduced in that the overall sum of deviations, as represented by the calibration quality value, can be decreased.

Besides, it is possible to display the calibration quality value or display the individual or overall deviations, e.g. on a displaying device. The calibration quality value may, inter alia, indicate a mean pointing error and/or a maximum pointing error. Advantageously, a single calibration process can be performed, wherein first and second calibration patterns are irradiated to determine the actual or initial condition of the calibration of the irradiation device. Based on the determined position information that relate to the position of the individual first and second calibration patterns the calibration quality value can be generated that indicates whether a calibration is necessary or whether the actual calibration meets defined quality criteria.

The actual calibration process can be performed by simulating changes of the first and second calibration patterns due to a change of individual irradiation parameters or parameters sets, e.g. relating to a control of the individual irradiation units, such as a control of beam guiding units, e.g. movable mirrors. By alternatingly changing the at least one irradiation parameter and simulating the resulting effect on the calibration quality value, it is possible to find an optimum calibration for the irradiation device without time-consuming and cumbersome irradiation of a large number of test specimen and measuring the resulting positions of the first and second calibration patterns.

According to an embodiment of the inventive method, a weight function may be used that assigns a weight factor to each calibration pattern or a group of calibration patterns, in particular for a defined part of the beam guiding plane. In other words, it is possible to define at least one weight function that can assign different weight factors to two different calibration patterns or groups of calibration patterns. For example, each calibration pattern may be assigned with a defined weight factor or groups of calibration patterns can be formed that can be assigned with a corresponding weight factor. Each weight factor defines the impact on the calibration quality value, e.g. how important the individual calibration pattern or group of calibration patterns is for the subsequent irradiation and additive manufacturing process. The weight factor may be defined dependent on the region in which the calibration pattern is generated in the beam guiding plane.

In other words, it is possible to define whether individual areas or regions of the beam guiding plane are more important for the calibration process than other regions. For example, a region which contains multiple or even a majority of features of an object to be built or in which a defined amount of filigree features is arranged can be deemed more important than other regions of the beam guiding plane in which only a small number of features is to be irradiated or more simple structures are to be built. By assigning different weight factors to different calibration patterns or groups of calibration patterns, it is possible to take such circumstances into consideration and enable a calibration of the irradiation device that is oriented on more relevant areas of the beam guiding plane.

For example, the beam guiding plane or the build plane, respectively, may be divided into at least two parts, wherein one part may comprise critical sections of an object to be manufactured in terms of detail degree or features that have to be irradiated, e.g. a shell structure and the other part of the beam guiding plane may comprise less critical parts, such as a core structure. Therefore, it is possible to improve the calibration for the at least one critical part of the beam guiding plane on the cost of the less critical part of the beam guiding plane. In other words, the weight function and the assignment of the at least one weight factor enables a prioritization of different parts of the beam guiding plane or the calibration of the irradiation device for different parts of the beam guiding plane, e.g. dependent on the structure that has to be built during the additive manufacturing process.

As described before, the calibration quality value may generally indicate an overall quality of the actual calibration status of the irradiation device. The calibration quality value may, inter alia, be or comprise a sum of the squares of the deviations of the positions of all calibration patterns in the at least one part of the beam guiding plane with respect to a nominal position of each calibration pattern. In other words, it is possible that the positions of the calibration patterns contribute to the calibration quality value, e.g. depending on the weight factor, as described before. In other words, the positions of all generated calibration patterns, namely the first and the second calibration patterns, can be used in that the squares of the deviations of the actual positions from the nominal positions, i.e. the positions in which each calibration pattern should be generated, can be summed up and therefore be represented by the calibration quality value.

By taking or considering the sum of the squares of the deviations of the positions of the calibration patterns, the calibration quality value represents the overall calibration status, as each calibration pattern is considered and deviations between the actual positions of the generated calibration patterns from the nominal positions of the calibration patterns in which the calibration patterns should be generated are taken into calculation. As every position of the calibration patterns contributes to the calibration quality value according to this embodiment, the calibration quality value is a direct indicator of the overall calibration status of the irradiation device.

Further, it is possible to adjust the irradiation parameter related with the determined maximum or minimum calibration quality value as irradiation parameter of one of the irradiation units. In other words, after determining the calibration quality value and simulating the effect of the change of the irradiation parameter or the change of the set of irradiation parameters on the positions of the calibration patterns, it is possible to find an irradiation parameter or a set of irradiation parameters that leads to a maximum or minimum calibration quality value. This irradiation parameter or set of irradiation parameters can be used as irradiation parameter of at least one of the irradiation units, particularly a set of irradiation parameters is found that leads to an optimum calibration of the irradiation device, as represented by a maximum or minimum calibration quality value. This irradiation parameter or a set of irradiation parameters can be adjusted as the irradiation parameter or the set of irradiation parameters of one or all irradiation units that are part of the irradiation device in that the overall calibration can be improved. Of course, different irradiation parameters or different sets of irradiation parameters may be determined for different irradiation units.

According to a preferred embodiment of the inventive method, multiple first and second calibration patterns may be generated in defined first and second positions two-dimensionally distributed across a test specimen, particularly equidistantly distributed. According to this embodiment, it is possible to distribute the first and second calibration patterns two-dimensionally across a test specimen, wherein the individual first and second calibration patterns are generated in defined first and second positions. Particularly, the individual calibration patterns are equidistantly distributed two-dimensionally across the test specimen. As test specimen any arbitrary suitable material or surface can be used, e.g. a test specimen made from a metal sheet, e.g. aluminum, or a glass plate with (color) paint, a laser marking tape or anodized aluminum plates, for instance. By generating multiple first and second calibration patterns distributed across the test specimen, it is possible to generate position information and determine the calibration information across the entire test specimen, e.g. resembling the size of the build plane and therefore, assuring that the calibration of the irradiation device is properly performed for any arbitrary position in the build plane.

Further, it is possible to determine at least two sets of position information each relating to the position of at least two first and/or second calibration patterns and/or relating to a relative position between at least one first and at least one second calibration pattern, based on the same pattern series, in particular generated in the same process. Thus, it is possible to determine two sets of position information based on the same pattern series, wherein the two sets of position information may each relate to the position of at least two first and/or second calibration patterns and/or may relate to a relative position between at least one first and at least one second calibration pattern. Thus, it is advantageously possible, to generate multiple calibration patterns, e.g. at least two first and second calibration patterns, wherein position information may be determined indicating whether the at least two first or at least two second calibration patterns are arranged in defined relative positions, e.g. spaced apart from each other by a defined relative distance. Of course, other arrangements leading to a defined relative position of the calibration patterns are also feasible, e.g. scaled, rotated, skewed or otherwise distorted patterns.

It is also possible to determine the relative position between the first and the second calibration pattern or every first and second calibration pattern. Thus, a determination can be made, whether the first calibration patterns that are generated via the first irradiation unit and the second calibration patterns that are generated via the second irradiation unit are arranged in their nominal positions, e.g. spaced away from each other by a defined relative distance or whether stitching errors occur. It is particularly preferred that the calibration patterns are generated in the same process, e.g. during the same irradiation step and the corresponding position information is also determined in the same process step in that position information relating to the position of the first calibration patterns and other position information relating to the position of the second calibration patterns or the relative position between the first and the second calibration patterns can be determined in the same determination process step.

According to another embodiment of the inventive method, a reference position may be defined and the position for the at least one first and second calibration pattern may be determined relative to the reference position and a deviation information may be determined relating to a deviation between the determined first and second position and nominal first and second positions. Thus, it is possible to arbitrarily define a reference position relative to which the individual positions, in particular first and second positions, of the first and second calibration patterns can be determined. The reference position may be any arbitrary position on the test specimen, e.g. the first position of the first calibration pattern, wherein, of course any arbitrary other calibration pattern, e.g. one of the second calibration patterns, a reference marker on the test specimen, e.g. the center of the test specimen, or the like, can be defined as reference position. Hence, the actual positions of the calibration patterns may be determined with respect to the reference position and therefore, it is possible to determine deviations between the actual positions of the calibration patterns and nominal positions of the calibration patterns in which they should be generated, if the irradiation device is properly calibrated.

The calibration patterns, namely the at least one first and the at least one second calibration pattern can be of any arbitrary shape or geometry. The at least one first or second calibration pattern may, inter alia, comprise a cross or a circle or a triangle or a line or a rectangle or an octagon or an ellipsis or an L-shaped pattern or a dot. Of course, the first and the second calibration patterns may be composed of an arbitrary combination of different shapes and/or geometries. However, it is particularly preferred that each calibration pattern comprises at least one reference marker, e.g. the branch of a cross or an edge of a triangle or a rectangle, relative to which it is possible to determine the position of the first or second calibration pattern or adjacent first or second calibration patterns. A geometry may be chosen that simplifies the determination process, e.g. via visual inspection or via a corresponding determination unit.

Further, the at least one first and second calibration patterns may be identical or different. Hence, it is possible that the first calibration patterns comprise a different shape or geometry than the second calibration patterns, wherein distinguishing between the two types of calibration patterns can be simplified using different geometries or different shapes for the different calibration patterns. For example, it is possible that the same geometry, e.g. a triangle, cross or circle is used, but different shapes, such as wider lines of the branches of a cross or the edges of a rectangle or the like, can be used for the different calibration patterns. Of course, it is also possible that for the first and second calibration patterns identical geometries and shapes are used.

According to another preferred embodiment of the inventive method, the calibration status may be determined visually or via a determination unit, particularly by determining at least one determination section, in particular a gap, between two adjacent first and second calibration patterns. Hence, as described before, it is possible that the calibration status of the irradiation device can be derived visually or determined via a determination unit. Advantageously, it is possible that service personnel may visually determine the calibration status of the irradiation device by analyzing the generated calibration patterns via eye inspection. It is also possible that the determination unit is used to determine the calibration status of the irradiation device, e.g. by automatically determining the position information of the calibration patterns on the test specimen and thereby generating the calibration information, as described before.

It is particularly preferred that at least one determination section is determined that is formed by at least two adjacent first and second calibration patterns, for example a gap arranged between a first and a second calibration pattern. The gap may be chosen in that two adjacent calibration patterns generated via a properly calibrated irradiation device are spaced away from each other by the gap, wherein the gap simplifies the determination process, as merely the size of the gap has to be determined, wherein a positioning error is directly linked with a deviation from a nominal gap size.

Further, the size of the gap between two facing branches of the first and a second calibration pattern and/or the relative position and/or orientation of two facing branches of an adjacent first and second calibration pattern can be determined. In other words, it is possible to choose the geometry of the first and second calibration patterns in that they comprise at least one branch, each, that faces the other calibration pattern. For example, each calibration pattern may be shaped as a cross comprising four branches facing towards the surrounding calibration patterns in the two-dimensional distribution on the test specimen, as described before. By determining the size of the gap between each two facing branches of the calibration patterns that are arranged adjacent to each other and/or the relative position and/or the orientation of two of those facing branches, it is possible to determine the calibration status of the irradiation device. For example, the relative position of the calibration patterns can be determined by determining the gap size, wherein displacements can be identified by looking at the relative position of the branches, such as the alignment of the branches. It is also possible to derive rotational errors of the irradiation device, e.g. by determining the orientation of the two facing branches, e.g. whether there is an angle enclosed by the two facing branches, in particular deviating from 0° or 180°, respectively.

As described before, it is possible to determine the position information via a determination unit, particularly a coordinate measuring unit and/or a scanning unit, in particular a camera. Thus, it is particularly preferred that the determination of the position information is performed automatically, e.g. by scanning the individual positions of the calibration patterns on the test specimen. For example, it is possible to use a coordinate measuring unit to determine the actual positions of the individual calibration patterns and compare the actual positions with the nominal positions. It is particularly preferred that the determination process in which the positions of the calibration patterns are determined can be performed in one determination step, e.g. by previously irradiating the individual calibration patterns on the test specimen and subsequently determining the position information for each calibration pattern.

According to another embodiment, a pattern series can be generated which comprises at least two first and at least two second calibration patterns, wherein the at least two first and second calibration patterns are arranged in a line, particularly alternatingly. Hence, the at least two first and the at least two second calibration patterns can be arranged on a common line, e.g. in the same row or column, on the test specimen, wherein each calibration pattern is arranged in a defined position. For example, it is possible to alternatingly arrange the first and the second calibration patterns in that at least one first calibration pattern is surrounded by adjacent second calibration patterns and vice versa. Thus, it is possible to simplify the determination process, as the position information for the first calibration patterns and the second calibration patterns can be determined and the relative position to the adjacent other calibration patterns can be determined. Hence, it is possible to derive whether the individual calibration patterns are arranged in the correct nominal position or whether a deviation occurs.

It is also possible to generate a two-dimensional pattern series, particularly comprising multiple pattern series, wherein the first and second calibration patterns are arranged alternatingly in two directions. As described before, it is possible that in the pattern series the first and the second calibration patterns are arranged alternatingly, wherein in the two-dimensional pattern series the calibration patterns are arranged alternatingly in two dimensions. Hence, except from the calibration patterns that are arranged on the edges of the two-dimensional pattern series, each calibration pattern is surrounded by calibration patterns of the other type, wherein, for example with respect to the branches or other reference markers of the calibration patterns, it is possible to directly determine whether the calibration patterns are properly positioned and oriented or if a deviation occurs that requires a calibration of the irradiation device. In general, for the determination process, the positions of the individual calibration patterns can be chosen arbitrarily. For example, it is possible to generate a random distribution of calibration patterns, wherein the calibration patterns are equally distributed across the two dimensions.

As described before, it is possible to determine position information which generally relates to the positions of the first and/or the second calibration patterns. In particular, the position information may be or may relate to an overlap of the irradiation regions of the at least two irradiation units, and/or an orientation of at least one irradiation unit, and/or a position of at least one calibration pattern, and/or a rotation of an irradiation region of at least one irradiation unit, and/or a distortion of an irradiation region of at least one irradiation unit, and/or a scaling of an irradiation region of at least one irradiation unit.

Of course, it is also possible that the position information may relate to a deviation of each of the previously mentioned parameters/properties, e.g. a deviation from a nominal overlap of the irradiation regions of the at least two irradiation units. Hence, the position information may indicate whether the calibration patterns are generated in the proper nominal position or whether a calibration of the irradiation device has to be performed. In particular, the position information may indicate whether an overlap of the irradiation regions of the at least two irradiation units is properly adjusted, i.e. the regions in which each irradiation unit is adapted to guide the corresponding energy beam.

Further, an orientation of at least one irradiation unit and/or a rotation of an irradiation region of at least one irradiation unit can be derived from the position information. It is also possible that occurring distortions of irradiation regions caused by one or both irradiation units can be derived and that the scaling of an irradiation region can be adjusted correctly, e.g. a different scaling between the two irradiation regions of the two irradiation units can be identified. Hence, it is possible that the position information relates to various parameters that may directly influence the calibration of the irradiation device. As these parameters may be determined by determining the position information, it is possible to assure that the irradiation device is properly calibrated or if a deviation from one of the nominal parameters comprised in the position information is identified, a proper calibration of the irradiation device can be performed.

Thus, it is possible to generate correction parameters based on which a calibration of at least one parameter of the irradiation device, in particular an irradiation parameter of at least one irradiation unit, can be performed. Therefore, it is possible that by performing the steps of determining the position information and generating the calibration information, the corresponding correction parameters can be generated that are used to perform the calibration process. For example, if a deviation from a nominal parameter is identified, the corresponding correction parameter can be generated that allows for calibrating the irradiation device in that the nominal value of the corresponding parameter can be met after the calibration.

Besides, the invention relates to an apparatus for additively manufacturing three-dimensional objects by means of successive layerwise selective irradiation and consolidation of layers of a build material which can be consolidated by means of an energy source, which apparatus comprises an irradiation device with at least a first and a second irradiation unit adapted to guide at least a first and a second energy beam, which apparatus comprises a determination unit adapted to determine position information relating to the positions of the at least two first and second calibration patterns generated by the irradiation device of the apparatus, wherein the at least two first calibration patterns are generated in at least two different first positions via the first energy beam and the at least two second calibration patterns are generated in at least two different second positions via the second energy beam generate a calibration quality value relating to a calibration status of the irradiation device in at least one part of a beam guiding plane, in particular an entire build plane, based on the determined position information, particularly based on a sum of deviations of the calibration patterns, simulate at least two first and second calibration patterns based on at least one adjusted irradiation parameter, determine a calibration quality value for the simulated calibration patterns, repeat the simulation of calibration patterns based on adjusted irradiation parameters and determination of the calibration quality value until a maximum or minimum calibration quality value is reached.

Self-evidently, all features, details and advantages described with respect to the inventive method are fully transferable to the inventive apparatus. In particular, the inventive method may be performed on the inventive apparatus to calibrate the irradiation device of the inventive apparatus.

FIG. 1 shows an apparatus 1 for additively manufacturing three-dimensional objects, wherein in a regular mode of operation of the apparatus 1 the three-dimensional objects can be manufactured by selective irradiation and consolidation of layers of a build material via an energy source. The apparatus 1 comprises an irradiation device 2 with two irradiation units 3, 4, wherein each irradiation unit 3, 4 comprises an energy source 5, e.g. a laser source adapted to generate an energy beam 6, 7, particularly a laser beam. In other words, the first irradiation unit 3 is adapted to guide the energy beam 6, e.g. via a first beam guiding unit 8, whereas the second irradiation unit 4 is adapted to guide the second energy beam 7 via a second beam guiding unit 9 across a build plane 10 in which for the purpose of calibrating the irradiation device 2 a test specimen 11 is arranged.

In this exemplary embodiment, the test specimen 11 is carried via a build plate 12 via which in a regular mode of operation non-consolidated build material and the object are height-adjustably carried. Of course, the test specimen 11 can be arranged in any other arbitrary position in a process chamber 13, i.e. the chamber in which the additive manufacturing process is performed in a regular mode of operation. Self-evidently, the inventive method is not restricted to the specific embodiment as depicted in FIG. 1, but the inventive method may be performed on any arbitrary additive manufacturing apparatus 1 comprising an irradiation device 2 independent of the specific setup inside the process chamber 13.

For performing the inventive method for calibrating the irradiation device 2 of the apparatus 1, at least two first and second calibration patterns 14, 15 (FIG. 2), in particular multiple first and second calibration patterns 14, 15 are generated on the test specimen 11. For the sake of simplicity, only four calibration patterns 14, 15 are generated as pattern series 16 arranged in a common line on the test specimen 11. Of course, an arbitrary number of calibration patterns 14, 15 can be arbitrarily arranged on the test specimen 11. In this exemplary embodiment, the calibration patterns 14, 15 are arranged alternatingly in the pattern series 16.

Figure 2:
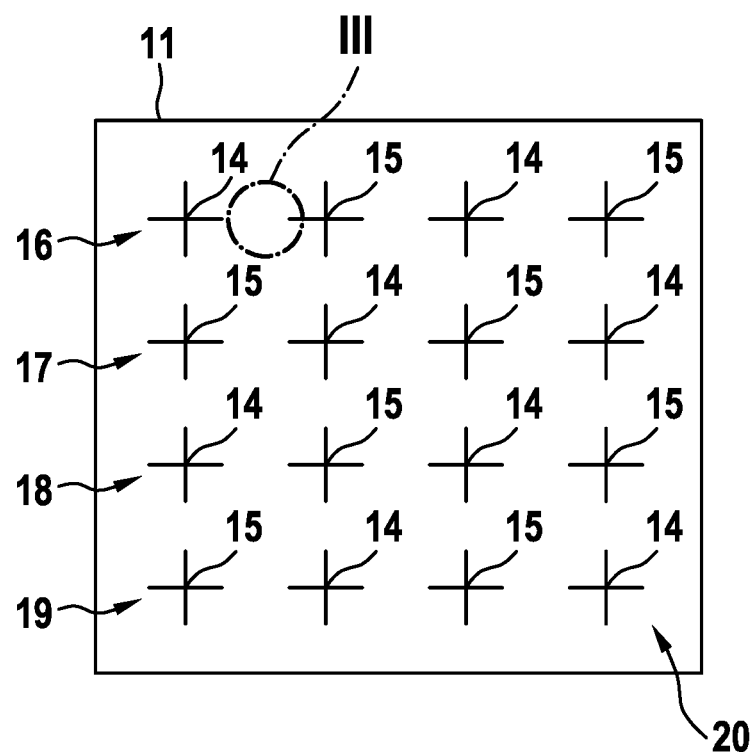
FIG. 2 shows a top view on a test specimen.

As can further be derived from FIG. 2, a two-dimensional pattern series 20 is generated comprising pattern series 16-19. Hence, the calibration patterns 14, 15 may be two-dimensionally distributed across the test specimen 11 via the individual pattern series 16-19 forming the two-dimensional pattern series 20. Thus, each calibration pattern 14, 15 is neighbored by two, three or four calibration patterns 14, 15 of the other type. As described before, the calibration patterns 14 are generated via the first irradiation unit 3 guiding the first energy beam 6 across the test specimen 11 and the second calibration patterns 15 are generated via the second irradiation unit 4 guiding the second energy beam 7 across the test specimen 11.

Although, the calibration patterns 14, 15 are shaped as crosses in this exemplary embodiment, any arbitrary shape or geometry can be used for the calibration patterns 14, 15. After the calibration patterns 14, 15 have been generated on top of the test specimen 11, it is possible to determine position information of the calibration patterns 14, 15. For example, it is possible to derive position information via eye inspection, by comparing the positions of the calibration patterns 14, 15. It is also possible to use a determination unit (not shown) that is adapted to determine the positions or the relative positions or deviations thereof of the individual calibration patterns 14, 15.

Figure 3:
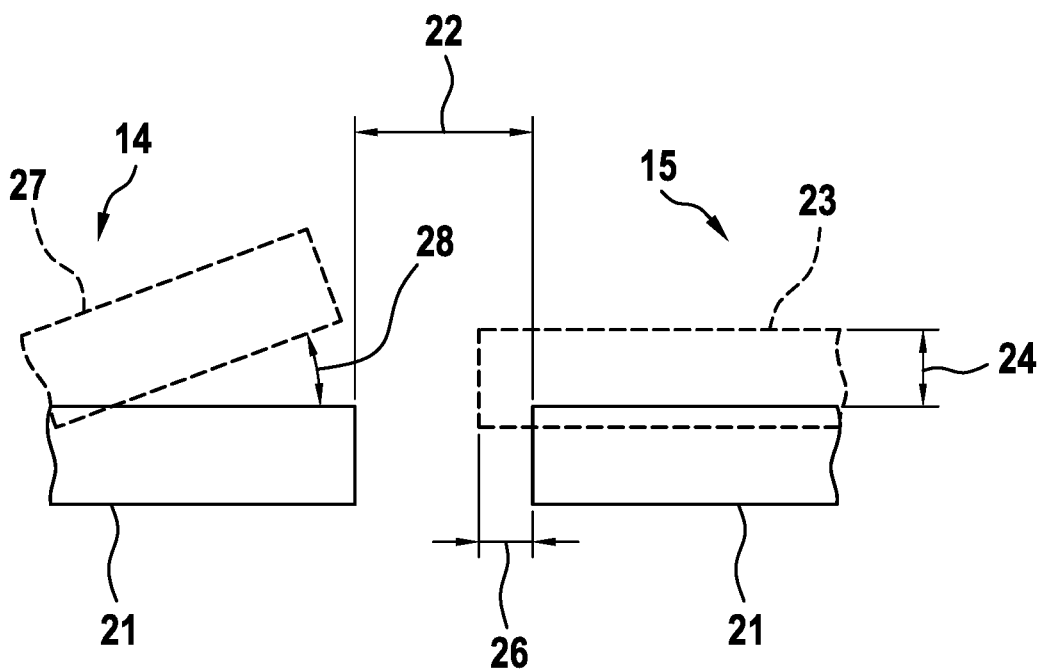
FIG. 3 shows a detail from FIG. 2.

As the calibration patterns 14, 15 are crosses comprising branches 21, each calibration pattern 14, 15 has at least two neighboring calibration patterns 14, 15 of the other type, wherein two branches 21 of two different calibration patterns 14, 15 face each other. FIG. 3 shows two facing branches 21 of two different calibration patterns 14, 15 as depicted via the dashed circle in FIG. 2. Between the two facing branches 21 a gap 22 is enclosed, wherein it is possible to determine the size of the gap 22 for determining the position information. For example, it is possible to determine whether the gap 22 has a defined size or whether a displacement of one of the branches 21 occurs relating to a positioning error of one of the irradiation units 3, 4 corresponding to whatever branch 21 is not in the nominal position.

For example, two positioning errors are depicted in FIG. 3, wherein a dotted line 23 depicts a spatial positioning error, wherein the calibration pattern 15, in particular the branch 21 of the calibration pattern 15 is displaced by a distance 24 in one direction and by a distance 26 in a second direction, for example in x-direction and y-direction. By determining the relative position of the calibration patterns 14, 15, in particular the facing branches 21, it is possible to determine whether the calibration patterns 14, 15 have been generated in the correct nominal position or whether a deviation occurs.

By deriving the position information it is possible to generate a calibration information relating to whether the irradiation device 2 is properly calibrated or whether a calibration is necessary. In the case of the dotted line 23 a calibration is necessary, as a deviation from a nominal position of the calibration pattern 15 occurs. Thus, it is possible to generate correction parameters that allow for correcting the second irradiation unit 4 in that the calibration pattern 15 can be generated in the proper nominal position.

Via a dashed line 27 a rotational error is depicted, wherein the calibration pattern 14 is rotated through an angle 28 relative to the nominal position. As described before, it is possible to determine the orientation between the two calibration patterns 14, 15, in particular the facing branches 21, if the angle 28 is determined, a calibration of the irradiation device 2 can be deemed necessary. Based on the position information that can be determined from the facing branches 21 it is possible to generate correction information allowing for performing a calibration process.

Figure 4:
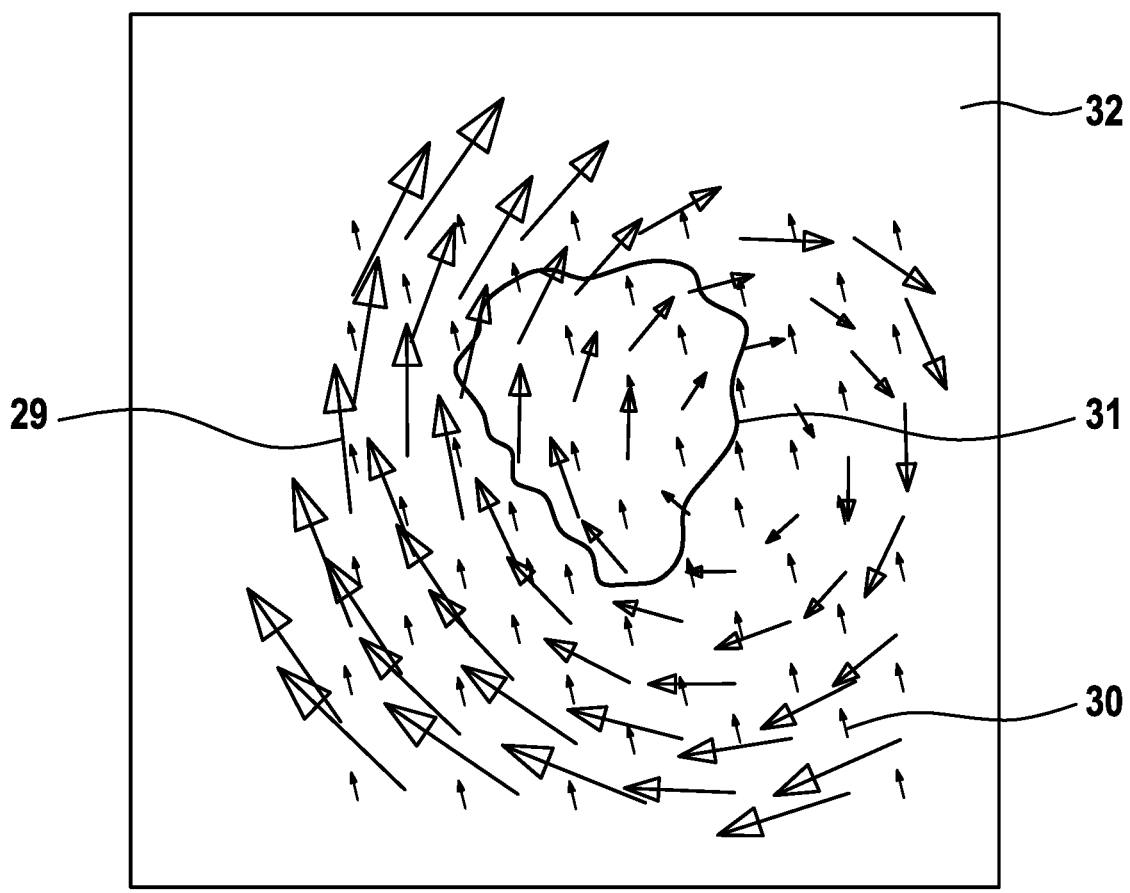
FIG. 4 shows an exemplary measurement of generated calibration patterns.

FIG. 4 shows an exemplary measurement of the deviations between the actual positions of the calibration patterns 14, 15 and their nominal positions. In this exemplary embodiment, deviations between the actual positions of the first calibration patterns 14 from the respective nominal positions are indicated with arrows 29, wherein corresponding deviations for the second calibration patterns are indicated via arrows 30. As can be derived from the FIG., by generating two sets of calibration patterns 14, 15 and determining the position information relating to the positions of the individual calibration patterns 14, 15, in particular first calibration patterns 14 and second calibration patterns 15, it is possible to determine a difference between the individual nominal positions and the actual positions of the calibration patterns 14, 15. Hence, the deviations may be determined for each calibration pattern 14, 15.

Based on the determined position information and the identified deviations it is possible to generate a calibration quality value that indicates the quality of the calibration of the irradiation device 2. In this exemplary embodiment, the sums of the squares of the deviations between the nominal positions and the actual positions of the calibration patterns 14, 15 are comprised in the calibration quality value. In other words, the squares of all deviations of the calibration patterns 14, 15 from their nominal positions are summed up. Thus, the calibration quality value is directly connected with the absolute value of deviations present in the irradiation device 2.

In order to calibrate the irradiation device 2, at least one irradiation parameter or a set of irradiation parameters can be changed and the effect on the positions of the calibration patterns 14, 15 is simulated. In other words, based on the measured position of the calibration patterns 14, 15 and the initial set of irradiation parameters, a change in the first and second positions of the first calibration patterns 14 and the second calibration patterns 15 based on the change of the at least one irradiation parameter or the set of irradiation parameters is performed. Hence, a further irradiation process is not necessary, since the change of positions of the calibration patterns 14, 15 caused by the change of the at least one irradiation parameter is simulated.

Thus, it is possible to determine a calibration quality value for the simulated calibration patterns, i.e. the resulting positions of the calibration patterns 14, 15 based on the simulation that is performed based on the at least one changed irradiation parameter. Therefore, it is possible to derive whether the change of the at least one irradiation parameter improves the calibration quality value, wherein the simulation of the at least two calibration patterns 14, 15 and changing the at least one irradiation parameter can be repeated until a maximum or minimum calibration quality value is found. For example, the simulation of the calibration patterns 14, 15 and the change of the irradiation parameter and determining the corresponding calibration quality value can be repeated until the determined calibration quality value does not differ from the former calibration quality value by a given threshold value or meets a predefined value, for instance.

It is also possible to define a weight function and assign a weight factor to each calibration pattern 14, 15 or to at least one group of calibration patterns 14, 15. In particular, it is possible to assign each calibration pattern 14, 15 a weight factor that defines the contribution to or impact on the calibration process. For example, the beam guiding region 10 can be divided into at least two parts, for example a first part 31 and a second part 32, wherein the first part 31 can be related to an area of the beam guiding plane 10 in which an object has to be built during a subsequent additive manufacturing process. Thus, the part 31 can be deemed as more important for the calibration process than the part 32 with respect to the following additive manufacturing process.

Therefore, the calibration patterns 14, 15 arranged in the part 31 of the beam guiding plane 10 can be assigned a higher weight factor than calibration patterns 14, 15 arranged outside the part 31, e.g. arranged in the part 32 of the beam guiding plane 10. Therefore, it is possible to increase the quality of the calibration in the part 31 on cost of the quality of the calibration in the part 32 of the beam guiding plane 10.

The inventive method may be performed on the inventive apparatus 1.

Further aspects of the invention are provided by the subject matter of the following clauses:

1. A method for calibrating an irradiation device (2) for an apparatus (1) for additively manufacturing three-dimensional objects by means of successive layerwise selective irradiation and consolidation of layers of a build material which can be consolidated by means of an energy beam (6, 7), which irradiation device (2) comprises at least a first and a second irradiation unit (3, 4) adapted to guide at least a first and a second energy beam (6, 7), the method comprising: generating at least two first and two second calibration patterns (14, 15), wherein the at least two first calibration patterns (14, 15) are generated in at least two different first positions via the first energy beam (6, 7) and the at least two second calibration patterns (14, 15) are generated in at least two different second positions via the second energy beam (6, 7); determining position information relating to the positions of the at least two first and second calibration patterns (14, 15); generating a calibration quality value relating to a calibration status of the irradiation device (2) for at least one part of a beam guiding plane (10), in particular an entire build plane, based on the determined position information, particularly based on a sum of the square of deviations of the calibration patterns (14, 15); simulating at least two first calibration patterns (14, 15) and at least two second calibration patterns (14, 15) based on at least one changed irradiation parameter; determining a calibration quality value for the simulated calibration patterns (14, 15); and repeating the simulation of calibration patterns (14, 15) based on adjusted irradiation parameters and determination of the calibration quality value until a maximum or minimum calibration quality value is reached.

2. The method of any preceding clause, comprising: using a weight function that assigns a weight factor to each calibration pattern (14, 15) or a group of calibration patterns (14, 15), in particular for a defined part (31, 32) of the beam guiding plane (10).

3. The method of any preceding clause, wherein the calibration quality value is a sum of the squares of deviations, particularly a sum of the squares of the weighted positions, of the positions of all calibration patterns (14, 15) in the at least one part of the beam guiding plane (10) with respect to a nominal position of each calibration pattern (14, 15).

4. The method of any preceding clause, comprising: adjusting the irradiation parameter related with the determined maximum or minimum calibration quality value as irradiation parameter of one of the irradiation units (3, 4).

5. The method of any preceding clause, comprising: generating multiple first and second calibration patterns (14, 15) in defined first and second positions two-dimensionally distributed across a test specimen, particularly equidistantly distributed.

6. The method of any preceding clause, comprising: determining at least two sets of position information each relating to the position of at least two first and/or second calibration patterns (14, 15) and/or relating to a relative position between at least one first and at least one second calibration pattern (14, 15), based on the same pattern series (16-20) (16), in particular generated in the same process.

7. The method of any preceding clause, comprising: defining a reference position and determining the position for the at least one first and second calibration pattern (14, 15) relative to the reference position and determining a deviation information relating to a deviation between the determined first and second position and nominal first and second position.

8. The method of any preceding clause, wherein the at least one first or second calibration pattern (14, 15) is or comprises a cross or a circle or a triangle or a line or a rectangle or an octagon or an ellipsis or an L-shaped pattern or a dot.

9. The method of any preceding clause, wherein the at least one first and second calibration patterns (14, 15) are identical or different.

10. The method of any preceding clause, comprising: determining the calibration quality value visually or via a determination unit, particularly by determining at least one determination section, in particular a gap (22), between two adjacent first and second calibration patterns (14, 15).

11. The method of any preceding clause, comprising: determining a size of a gap (22) between two facing branches (21) of a first and a second calibration pattern (14, 15) and/or the relative position and/or orientation of two facing branches (21) of an adjacent first and second calibration pattern (14, 15).

12. The method of any preceding clause, comprising: determining the position information via a determination unit, particularly a coordinate measuring unit and/or a scanner unit, in particular a camera.

13. The method of any preceding clause, comprising: generating a pattern series (16-20) (16) comprising at least two first and at least two second calibration patterns (14, 15), wherein the at least two first and second calibration patterns (14, 15) are arranged in a line, particularly alternatingly.

14. The method of any preceding clause, comprising: generating a two-dimensional pattern series (16-20) (16), particularly comprising multiple pattern series (16-20) (16), wherein the first and second calibration patterns (14, 15) are arranged alternatingly in two directions.

15. The method of any preceding clause, wherein the position information is or relates to: an overlap of the irradiation regions of the at least two irradiation units (3, 4) and/or an orientation of at least one irradiation unit (3, 4); and/or a position of at least one calibration pattern (14, 15); and/or a rotation of an irradiation region of at least one irradiation unit (3, 4); and/or a distortion of an irradiation region of at least one irradiation unit (3, 4); and/or a scaling of an irradiation region of at least one irradiation unit (3, 4).

16. An apparatus (1) for additively manufacturing three-dimensional objects by means of successive layerwise selective irradiation and consolidation of layers of a build material which can be consolidated by means of an energy source (5), which apparatus (1) comprises an irradiation device (2) with at least a first and a second irradiation unit (3, 4) adapted to guide at least a first and a second energy beam (6, 7), the apparatus comprising a determination unit adapted to: determine position information relating to the positions of the at least two first and second calibration patterns (14, 15) generated by the irradiation device (2) of the apparatus (1), wherein the at least two first calibration patterns (14, 15) are generated in at least two different first positions via the first energy beam (6, 7) and the at least two second calibration patterns (14, 15) are generated in at least two different second positions via the second energy beam (6, 7); generate a calibration quality value relating to a calibration status of the irradiation device (2) in at least one part of a beam guiding plane (10), in particular an entire build plane, based on the determined position information, particularly based on a sum of deviations of the calibration patterns (14, 15); simulate at least two first and second calibration patterns (14, 15) based on at least one adjusted irradiation parameter; determine a calibration quality value for the simulated calibration patterns (14, 15); and repeat the simulation of calibration patterns (14, 15) based on adjusted irradiation parameters and determination of the calibration quality value until a maximum or minimum calibration quality value is reached.

17. The apparatus of any preceding clause, wherein the determination unit is configured to: adjust the irradiation parameter related with the determined maximum or minimum calibration quality value as irradiation parameter of one of the irradiation units (3, 4).

18. The apparatus of any preceding clause, wherein the determination unit is configured to: determine at least two sets of position information each relating to the position of at least two first and/or second calibration patterns (14, 15) and/or relating to a relative position between at least one first and at least one second calibration pattern (14, 15), based on the same pattern series (16-20) (16), in particular generated in the same process.

19. The apparatus of any preceding clause, comprising: determining the calibration quality value visually or via a determination unit, particularly by determining at least one determination section, in particular a gap (22), between two adjacent first and second calibration patterns (14, 15).

20. The apparatus of any preceding clause, wherein the apparatus and/or the determination unit is adapted to perform the method of any preceding clause.

21. A computer-readable medium comprising computer-executable instructions, which when executed by a determination unit associate with an apparatus for additively manufacturing three-dimensional objects, causes the determination unit to perform a method comprising: determining position information relating to the positions of the at least two first and second calibration patterns (14, 15) generated by the irradiation device (2) of the apparatus (1), wherein the at least two first calibration patterns (14, 15) are generated in at least two different first positions via the first energy beam (6, 7) and the at least two second calibration patterns (14, 15) are generated in at least two different second positions via the second energy beam (6, 7); generating a calibration quality value relating to a calibration status of the irradiation device (2) in at least one part of a beam guiding plane (10), in particular an entire build plane, based on the determined position information, particularly based on a sum of deviations of the calibration patterns (14, 15); simulating at least two first and second calibration patterns (14, 15) based on at least one adjusted irradiation parameter; determining a calibration quality value for the simulated calibration patterns (14, 15); and repeating the simulation of calibration patterns (14, 15) based on adjusted irradiation parameters and determination of the calibration quality value until a maximum or minimum calibration quality value is reached.

22. The computer-readable medium of any preceding clause, wherein the computer-executable instructions, when executed by a determination unit associate with an apparatus for additively manufacturing three-dimensional objects, cause the determination unit to perform the method any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of calibrating an irradiation device for an apparatus for additively manufacturing three-dimensional objects, the method comprising:
    generating at least two first calibration patterns and at least two second calibration patterns on a build plane, wherein the at least two first calibration patterns are generated in at least two different first positions on the build plane by a first energy beam and wherein the at least two second calibration patterns are generated in at least two different second positions on the build plane by a second energy beam;
    determining position information relating to the at least two first calibration patterns and the at least two second calibration patterns;
    determining a calibration quality value based at least in part on the position information, the calibration quality value relating to a calibration status of an irradiation device for at least a portion of the build plane;
    performing a simulation for a plurality of iterations, wherein the simulation comprises, for a respective iteration of the simulation, simulating generation of the at least two first calibration patterns and the at least two second calibration patterns with a simulated change to at least one irradiation parameter and determining the calibration quality value corresponding to the respective iteration of the simulation; and
    determining at least one of a maximum calibration quality value and a minimum calibration quality value from the plurality of iterations of the simulation.

2. The method of claim 1, comprising:
    assigning a weight factor to at least one of: the at least two first calibration patterns and the at least two second calibration patterns.

3. The method of claim 1, wherein the calibration quality value comprises a sum of squares of a deviation in a determined position relative to a nominal position, the deviation in the determined position relative to the nominal position determined for at least some of: the at least two first calibration patterns and the at least two second calibration patterns.

4. The method of claim 1, comprising:
    adjusting the at least one irradiation parameter based at least in part on the respective iteration of the simulation corresponding to at least one of: the maximum calibration quality value and the minimum calibration quality value.

5. The method of claim 1, wherein generating at least two first calibration patterns and at least two second calibration patterns on the build plane comprises:
    generating a plurality of first calibration patterns on the build plane, wherein the plurality of first calibration patterns are respectively located at respective ones of a plurality of first positions distributed two-dimensionally across the build plane, and generating a plurality of second calibration patterns on the build plane, wherein the plurality of second calibration patterns are respectively located at respective ones of a plurality of second positions distributed two-dimensionally across the build plane.

6. The method of claim 5, wherein determining position information relating to the at least two first calibration patterns and the at least two second calibration patterns comprises:
determining a first set of position information relating to a first portion of the plurality of first calibration patterns and a first portion of the plurality of second calibration pattern, and determining a second set of position information relating to a second portion of the plurality of first calibration patterns and a second portion of the plurality of second calibration pattern.

7. The method of claim 6, wherein the first set of position information corresponds to a first pattern or series, and wherein the second set of position information corresponds to a second pattern or series.

8. The method of claim 1, wherein determining position information relating to the at least two first calibration patterns and the at least two second calibration patterns comprises at least one of:
defining a first reference position from among the at least two first calibration patterns and determining a first position of at least one of: another one of the at least two first calibration patterns relative to the first reference position, and one or more of the at least two second calibration patterns relative to the first reference position; and
defining a second reference position from among the at least two second calibration patterns and determining a second position of at least one of: another one of the at least two second calibration patterns relative to the second reference position, and one or more of the at least two first calibration patterns relative to the second reference position.

9. The method of claim 1, wherein the at least two first calibration patterns comprises at least one of: a cross, a circle, a triangle, a line, a rectangle, an octagon, an ellipsis, an L-shaped pattern, and a dot; and
wherein the at least two second calibration patterns comprises at least one of: a cross, a circle, a triangle, a line, a rectangle, an octagon, an ellipsis, an L-shaped pattern, and a dot.

10. The method of claim 1, wherein the at least two first calibration patterns respectively have a common geometric shape relative to one another.

11. The method of claim 1, wherein the at least two second calibration patterns have a respective geometric shape that differs from one or more of the at least two first calibration patterns.

12. The method of claim 1, wherein determining position information relating to the at least two first calibration patterns and the at least two second calibration patterns comprises at least one of:
determining a first gap between a respectively adjacent first pair from among the at least two first calibration patterns, and determining a second gap between a respectively adjacent second pair from among the at least two second calibration patterns.

13. The method of claim 12, wherein the respectively adjacent first pair comprises a first pair of facing calibration pattern boundaries and wherein the first gap comprises a first distance between the first pair of facing calibration pattern boundaries, and wherein the respectively adjacent second pair comprises a second pair of facing calibration pattern boundaries and wherein the second gap comprises a second distance between the second pair of facing calibration pattern boundaries.

14. The method of claim 1, determining position information relating to the at least two first calibration patterns and the at least two second calibration patterns comprises:
determining a displacement between a first one of the at least two first calibration patterns and a corresponding second one of the at least two second calibration patterns.

15. The method of claim 1, determining position information relating to the at least two first calibration patterns and the at least two second calibration patterns comprises:
determining an angle of rotation of a first one of the at least two first calibration patterns relative to a corresponding second one of the at least two second calibration patterns.

16. The method of claim 1, wherein the at least two first calibration patterns and the at least two second calibration patterns are arranged in at least one line.

17. The method of claim 16, wherein the at least two first calibration patterns and the at least two second calibration patterns are arranged alternatingly in at least two directions.

18. The method of claim 1, wherein the position information relates an irradiation region parameter for at least one of a first irradiation region of the first energy beam and a second irradiation region of the second energy beam, the irradiation region parameter comprising at least one of: an overlap, a position, a rotation, a distortion, and a scaling.

19. A non-transitory computer-readable medium comprising computer-executable instructions, which when executed by a processor associated with an apparatus for additively manufacturing three-dimensional objects, causes the processor to perform a method comprising:
generating at least two first calibration patterns and at least two second calibration patterns on a build plane, wherein the at least two first calibration patterns are generated in at least two different first positions on the build plane by a first energy beam and wherein the at least two second calibration patterns are generated in at least two different second positions on the build plane by a second energy beam;
determining position information relating to the at least two first calibration patterns and the at least two second calibration patterns;
determining a calibration quality value based at least in part on the position information, the calibration quality value relating to a calibration status of an irradiation device for at least a portion of the build plane;
performing a simulation for a plurality of iterations, wherein the simulation comprises, for a respective iteration of the simulation, simulating generation of the at least two first calibration patterns and the at least two second calibration patterns with a simulated change to at least one irradiation parameter and determining the calibration quality value corresponding to the respective iteration of the simulation; and
determining at least one of a maximum calibration quality value and a minimum calibration quality value from the plurality of iterations of the simulation.

* * * * *